United States Patent

[11] 3,609,591

[72] Inventor Gerrit Hendrik Van Hensbergen
Hilversum, Netherlands
[21] Appl. No. 858,443
[22] Filed Sept. 16, 1969
[45] Patented Sept. 28, 1971
[73] Assignee U.S. Philips Corporation
New York, N.Y.
[32] Priority Sept. 17, 1968
[33] Netherlands
[31] 6813243

[54] PULSE GENERATOR WIDTH MODULATED BY ITS FILTERED OUTPUT FOR PRODUCING SINUSOIDIAL OUTPUT

8 Claims, 4 Drawing Figs.

[52] U.S. Cl. .................................................... 331/108 B,
331/109, 331/111, 331/114, 331/117, 331/168, 331/183

[51] Int. Cl. .................................................... H03b 3/02,
H03b 5/12

[50] Field of Search ............................................ 331/108,
109, 111, 114, 117, 168, 183

[56] References Cited

UNITED STATES PATENTS

| | | | |
|---|---|---|---|
| 3,047,736 | 7/1962 | Dornhoefer .................. | 331/117 X |
| 3,327,234 | 6/1967 | Grenier ........................ | 331/117 |

*Primary Examiner*—Roy Lake
*Assistant Examiner*—Siegfried H. Grimm
*Attorney*—Frank R. Trifari

ABSTRACT: An electronic arrangement for generating an alternating current comprising a pulse generator having a fixed frequency which is high compared with the frequency of the alternating current to be generated, a switching amplifier by which the pulses generated by this generator are amplified, a low-pass filter by way of which the alternating current generated can be supplied to the output terminals, and a circuit tuned to the frequency of the alternating current to be generated and excited by the amplified pulses. The voltage across this tuned circuit is used to pulse-width modulate the high frequency pulses so that after buildup a strong component at the desired frequency appears at the output terminals.

INVENTOR.
GERRIT H. VAN HENSBERGEN
BY
AGENT

INVENTOR.
GERRIT H. VAN HENSBERGEN
BY
Frank R. Trifari
AGENT

INVENTOR.
GERRIT H. VAN HENSBERGEN
BY
Frank R. [signature]
AGENT

PULSE GENERATOR WIDTH MODULATED BY ITS FILTERED OUTPUT FOR PRODUCING SINUSOIDIAL OUTPUT

The invention relates to an arrangement for generating an alternating current. It is an object of the invention to provide an arrangement which is suitable for the high-efficiency generation of a sinusoidal alternating current which has a small distortion factor and the frequency of which can readily be varied by varying the natural frequency of a single tuned circuit and may, if desired, by very low, for example 10 Hz. It is a further object of the invention to provide an arrangement which is capable of withstanding a short circuit and the output frequency of which is substantially independent of the load impedance, irrespective of whether this load is capacitive, resistive or inductive, and which is capable of delivering a comparatively high alternating-current power with the use of amplifier elements of comparatively low power, especially transistors.

Such arrangements may be used as ringing or call voltage generators in telephone systems, as control generators in low frequency remote control systems of for feeding electric motors, for example synchronous motors, with a current of a desirable, for example adjustable, frequency.

The arrangement according to the invention is characterized in that it comprises a pulse generator having a fixed frequency which is high compared with that of the alternating current to be generated and a variable pulse width, a switching amplifier by which the pulses produced by this generator are amplified, a low-pass filter which is connected to the output terminals of this amplifier and through which the alternating current generated can be supplied to the output terminals of the arrangement, and a circuit which is tuned to the frequency of the alternating current to be generated and through which the generator is pulse width modulated by the output voltage of the low-pass filter.

The use of a switching or class D amplifier produces a satisfactory efficiency and also enables a considerable alternating-current output power to be generated by means of amplifier elements of comparatively low power, while the frequency of this alternating current is readily and exclusively variable by varying the natural frequency of the single tuned circuit, as long as this frequency remains materially, for example eight times, lower than that of the pulse generator.

A small distortion factor of the alternating current generated is readily obtainable by, possibly automatic, balancing of the pulse generator, by limitation of the modulation voltage and/or by suitable negative feedback, and the arrangement can readily be made capable of withstanding a short circuit by applying the output voltage of the low-pass filter from the output terminals of the arrangement to the tuned circuit: in the case of a short circuit of these output terminals or even in the case of heavy overloading the modulation of the pulse generator and consequently the production of a sinusoidal alternating current is suppressed.

The invention will now be described more fully with reference to the accompanying drawings, in which.

Figure 1:
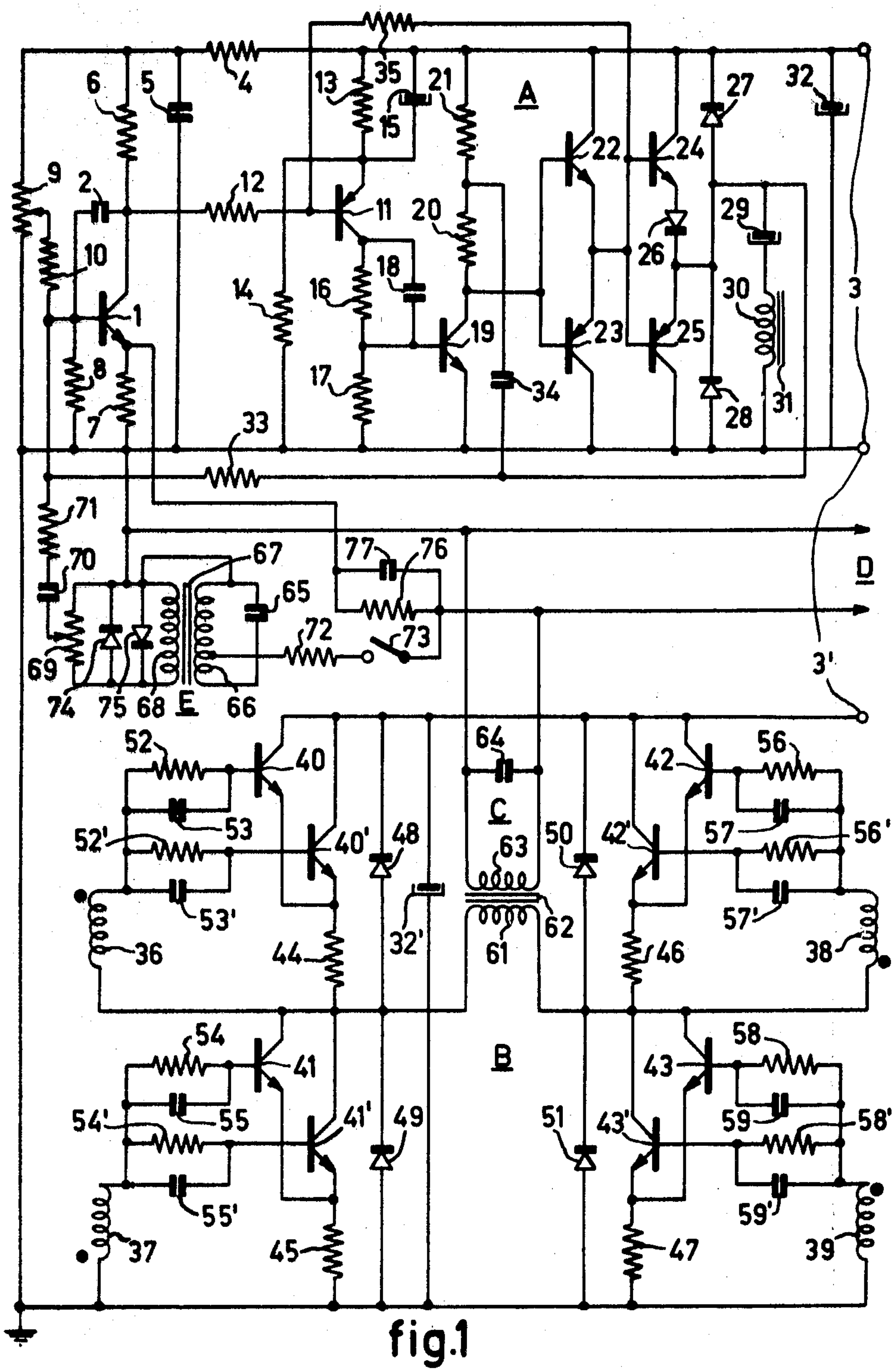
FIG. 1 is a circuit diagram of a first embodiment of an arrangement according to the invention.

The embodiment shown schematically in FIG. 1 is an entirely transistorized arrangement suitable for generating a considerable power of a low frequency sinusoidal electric alternating current with a comparatively high efficiency. This arrangement comprises:

a pulse generator A for generating pulses at a fixed frequency of, say, 24 kHz. which is high compared with the frequency of, say, 30 Hz. of the alternating current to be generated and having a variable pulse width;

a switching amplifier B by which the pulses generated by the generator A are amplified;

a low-pass filter C which is connected to the output terminals of the amplifier B and through which the alternating current generated can be supplied to the output terminals D of the arrangement; and a circuit E which is tuned to the frequency of the alternating current to be generated and by way of which the generator A is pulse width modulated by the output voltage of the low-pass filter C.

The pulse generator A includes a Miller integrator comprising a NPN transistor 1 of the type 2N2219 and a capacitor 2 connected between the base and the collector of the transistor. This integrator determines the operating frequency of the pulse generator A. The capacitor 2 of, say 4,700 pf. is alternately charged by the positive voltage of, say, 34 volts of a supply source 3 through an RC decoupling network 4,5 of 1 kΩ and 0.1 $\mu$f. and a collector resistor 6 of 33 kΩ and discharged through the collector emitter path of the transistor 1 and an emitter resistor 7 of 47 Ω, the means potential of the base of the transistor 1 being determined by a resistor 8 of 10 kΩ through which this base is connected to earth and by the position of the tapping on a potentiometer 9 of 20 kΩ connected in parallel with the capacitor 5, since this tapping is connected to this base through a resistor 10 of 220 kΩ.

The collector of the transistor 1 is connected to the base of a PNP transistor 11 of the type N 2904 through a resistor 12 of 1.2 kΩ. The emitter of this amplifier transistor is connected to the tapping of a voltage divider comprising resistors 13 and 14 of 3 kΩ each and connected across the source 3, and is also decoupled from the positive terminal of the source 3 by an electrolytic capacitor 15 of 125 $\mu$f. The collector of the transistor 11 is connected to earth through two series-connected resistors 16 and 17 of 1.2 kΩ each, the resistor 16 being shunted by a capacitor 18 of 0.1 $\mu$f., and the junction point of these two resistors is connected to the base of a second amplifier transistor 19 of the NPN type 2N 930.

The emitter of the transistor 19 is connected to earth and the collector is connected to the positive terminal of the source 3 by way of two series-connected resistors 20 and 21 of 2.7 kΩ and 690 Ω, respectively, and is directly connected to the bases of two power transistors 22 and 23 of the NPN-type BFY 44 and of the PNP-type 2N 2904 respectively included in a single-ended push-pull amplifier stage. Not only the bases but also the emitters of the transistors 22 and 23 are directly interconnected the collectors being directly connected to the positive terminal of the source 3 and to earth respectively.

Again, the emitters of the transistors 22 and 23 are directly connected to the bases of two further power transistors 24 and 25 of the NPN-type BFY 44 and of the PNP-type 2N 2904 respectively included in a second single-ended push-pull amplifier stage. A diode 26 of the type BAX 78 is connected in the pass direction between the emitters of the transistors 24 and 25, a diode 27 of the type BAX 78 connected in the reverse direction shunts the series connection of the collector emitter path of the transistor 24 and of the diode 26, and a diode 28 of the same type and also connected in the reverse direction shunts the emitter collector path of the transistor 25.

The output circuit of the pulse generator A comprising a separating capacitor 29 connected in series with the primary winding 30 of an output transformer 31 is connected between the junction point of the diodes 26, 27 and 28 and that of the emitter of the transistor 25 and earth, while the source 3 is additionally shunted by an electrolytic capacitor 32 of 800 $\mu$f.

In the pulse generator A oscillations are sustained by a feedback path comprising a resistor 33 of 560 kΩ connected between the emitter of the transistor 25 and the base of the transistor 1 owing to the fact that inter alia in view of the integrating effect of the stages stage and the greatly differentiating effect of the three final STAGES the feedback path has a positive feedback effect and that the amplification across the closed loop is greater than unity.

Assuming, for example, that the transistor 24 has just become conductive, with the transistor 25 cut off, the base current of the transistor 1 is increased by the current flowing to this base and to the resistor 8 from the positive terminal of the source 3 through the transistor 24 and the resistor 33. This causes a decreases of the voltage across the collector emitter path of the transistor 1, which decrease takes place with a slowness determined by the negative feedback by means of the capacitor 2. At the instant at which the voltage at the collector of the transistor 1 becomes lower than that at the tapping of the voltage divider 13, 14 a forward base current is supplied to the transistor 11 through the resistor 12 so that this transistor becomes conductive. As a result, the transistor 19 is also rendered conductive and applies a forward voltage to the base of the transistor 23 so that the transistors 23 and 25 become highly conductive and the transistors 22 and 24 are cut off.

Figure 2:
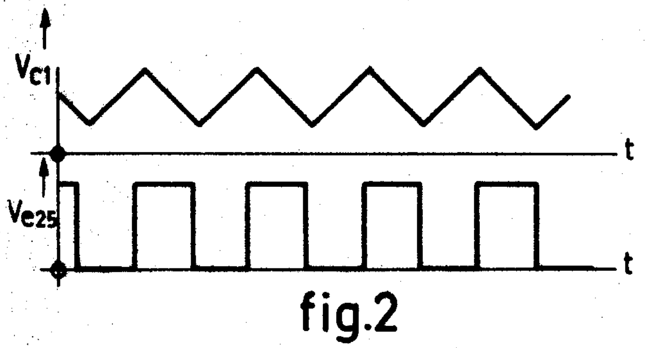
FIGS. 2 and 3 are voltage waveforms illustrating the operation of this arrangement.

The base of the transistor 1 now is connected to earth through the resistor 33 and the transistor 25 so that the voltage at the collector of this transistor increases again with the same slowness with which it previously decreased. At the instant at which this voltage again exceeds that at the tapping of the voltage divider 13, 14 the transistor 11 and consequently the transistors 19, 23 and 25 are cut off again, whereas the transistors 22 and 24 are rendered highly conductive again. Thus, there is produced at the collector of the transistor 1 a sawtooth voltage $V_{c1}$ of the shape shown in the first line of FIG. 2, while the output voltage at the emitter of the transistor 25 is a square wave voltage $V_{e25}$ of the shape shown in the second line of this figure.

A capacitor 34 of 0.5 μf. is connected between the emitter of the transistor 25 and the tapping on the collector resistor 20, 21 of the transistor 19. At the instant at which the transistors 11 and 19 are cut off and the transistors 22 and 24 become conductive, the potential of that electrode of this capacitor which is connected to the emitter of the transistor 25 abruptly changes from 0 volt to +34 volts so that the potential of the other electrode, which is connected to the tapping of the voltage divider 20, 21 becomes considerably higher than +34 volts, in this case about +50 volts. During the time in which the transistors 11 and 19 remain cut off and the transistors 22 and 24 remain conductive, this capacitor discharges and thereby supplies the base current for the transistor 22 so that this transistor becomes and remains fully conductive, which would not be the case with a forward base voltage of only 34 volts applied through a comparatively large resistor, since the transistor 22 operates as an emitter follower and hence with a high degree of negative feedback; the sum of the voltage drops across this transistor and across the transistor 24 would be slightly greater than the product of its base current $I_{b22}$ and the collector resistor $R_{20}+R_{21}$ of the transistor 19 and, depending on the load, the dissipation on the transistor 24 and possible also in the transistor 22 would exceed the permissible value.

On the other hand, the collector resistor of the transistor 19 cannot considerably be reduced since otherwise during the conductive periods of this transistor the dissipation in it would become excessive. Hence, the source resistance of the control stage including the transistor 19 is artificially reduced by means of the capacitor 34, while the dissipation in the resistor 21 may be avoided by substituting an inductance or a diode connected in the pass direction for this resistor.

The pulse generator A is further provided with a second regenerative feedback circuit in the form of a resistor 35 of 560 kΩ connected between the emitters of the transistors 22 and 23 and the base of the transistor 11 of the first amplifier stage. This feedback improves the edge steepness of the rectangular pulses produced by the generator (second line of FIG. 2) so that at least the amplifier stages including the transistors 22, 23 and 24, 25 act as true switching-amplifier stages.

The switching amplifier B is an output amplifier stage including four groups which each comprise two NPN transistors, for example of the type 2N 3716, connected in a double single-ended push-pull stage, the groups being connected together in pairs and being fed by a common direct-voltage supply source 3′ of 50 volts. The parallel combination of the collector emitter paths of the two transistors of each group, for example the transistors 40 and 40′, is connected in series with a common emitter -coupling resistor of 0.1 Ωfor example 44. A diode of the type BAX 78, is connected in the reverse direction across each of these series circuits, for example the diode 48 across 40+40′ and 44.

The base of each transistor of each group is connected to an end of an associated secondary winding, for example 36, of the transformer 31 through a resistor of 3.3 Ω, for example 52 or 52′, shunted by a capacitor of 1 μf., for example 53 or 53′ respectively. The winding directions of the secondary windings 36, 37, 38 and 39 of the transformer 31 for the various transistor groups are chosen so that those transistors of a series combination of two groups (for example 40, 40′ and 41, 41′) which are connected to the positive terminal of the source 3′, for example the transistors 40 and 40′, and those transistors of the other series combination of two groups (42, 42′ and 43, 43′) which are connected to earth, for example 43 and 43′, are simultaneously rendered conductive and simultaneously cut off, the other end of each of the windings 36 to 39 being connected to that end of the emitter resistor of the corresponding group, for example the resistor 44, which is not connected to the emitters of the transistors of this group.

Similarly to the source 3, the source 3′ is shunted by an electrolytic capacitor 32′ of 800 μf.

The primary 61 of an output transformer 62 is connected between the respective junction points of the two groups of each series combination of two groups of transistors, so that the voltage of the source 3′ is applied to this winding alternately in one direction and in the other through the transistor groups 40, 40′ and 43, 43′ through the other transistor groups 41, 41′ and 42, 42′.

The low-pass filter C is constituted by a capacitor 64 of 4.7 μf. connected across the secondary 63 of the transformer 62 and by the stray inductance of this transformer.

The output terminals D of the arrangement are directly connected to the electrodes of the capacitor 64 one of which is also directly connected to earth.

The tuned circuit E comprises a capacitor 65 of 2.5 μf. and the inductance of a transformer 67 to the primary 66 of which this capacitor is connected. The secondary 68 of this transformer is connected to earth at one end, as is the primary 66, and is shunted by a potentiometer 69 the tapping of which is connected to the base of the transistor 1 through the series combination of a capacitor 70 of 2.5 μf. and a resistor 71 of 10 kΩ. Finally a tapping of the primary 66 is connected to the nonearthed output terminal D through a resistor 72 of 2.4 Ω and a make and break switch 73.

When the switch 73 is open the square wave voltage generated by the pulse generator A is amplified by the switching amplifier B and applied to the primary 61 of the output transformer 62. The low-pass filter C suppresses all harmonics of this square wave voltage having a fundamental frequency of, say, 25 kHz. and allows only a very small part of the fundamental frequency of this square wave voltage having an amplitude of, say 0.13 volt effective peaks of the square wave voltage have the same duration as its negative peaks. This ratio is adjustable by variation of the mean potential of the base of the transistor 1 by means of the potentiometer 9, and the series diode 26 improves the equality of the positive and negative portions of the pulses generated and hence reduces a direct-current component which may be produced in the output signal by unequal residual voltages across the transistors 24 and 25. When this pulse voltage is not satisfactorily symmetrical, a direct current flows through the primary 61 of the transformer 62, and this reduces the efficiency of the arrangement and gives rise to distortion because a limit is set to the degree of driving of the amplifier in one direction.

If now the switch 73 is closed, the tuned circuit E is excited through this switch and the resistor 72 by the small ripple voltage at the output terminals D. As a result, first a very small alternating voltage at the natural frequency of, say, 30 Hz. of this circuit is produced across the primary 66 and hence also across the secondary 68 of the transformer 67. By way of the potentiometer 69, the capacitor 70 and the resistor 71 an adjustable portion of this low frequency voltage is transmitted to the base of the transistor 1, where it causes a periodic variation of the operating point of this transistor and hence a pulse width modulation of the pulses generated by the pulse generator A. If the winding 63 is connected with suitable polarity and the overall amplification across the loop comprising the pulse generator A, the switching amplifier B, the filter C, the resistor 72 the tuned circuit E, the transformer 67, the potentiometer 69, the capacitor 70 and the resistor 71 is greater than unity at the frequency set (50 Hz.) the modulation is built up and with suitable setting even reaches 100 percent. An alternating voltage $V_D$ at the chosen frequency (50 Hz.) and having an amplitude of the order of 40 volts r.m.s. (first line of FIG. 3) appears at the output terminals D. This alternating voltage is greatly distorted and its more or less square form indicates either overdriving by the modulation or overmodulation. This distortion is largely eliminated by limiting the modulation voltage by means of two diodes 74 and 85 of the type 0A 202 which are connected in an inverse-parallel relation and when they become conductive reduce the loop amplification to less than unity.

Figure 3:
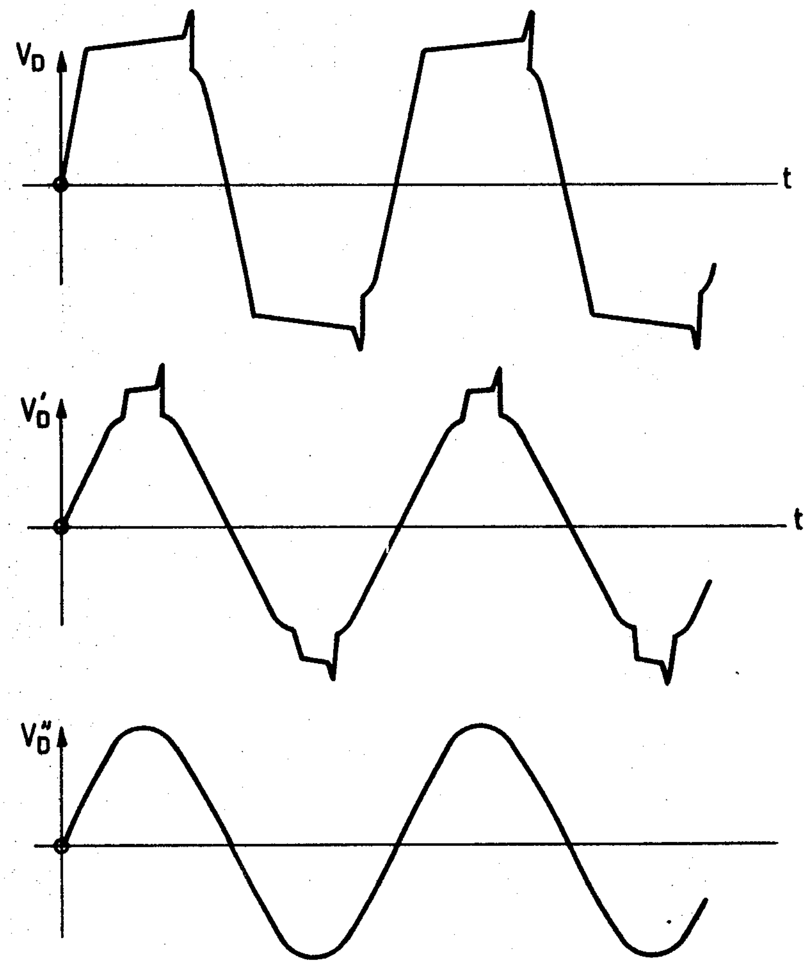

The output voltage $V_D'$ improved by this step is shown in the second line of FIG. 3. It still has a considerable content of odd harmonics, but these can be eliminated substantially entirely by means of negative feedback between the output terminals D and the transistor 1, resulting in the form $V_D''$ shown in the third line of FIG. 3. This negative feedback is produced by the inclusion of the parallel combination of a resistor 76 of 1 kΩ and a capacitor 77 of 0.2 $\mu$f. between the nonearthed output terminals D and the emitter of the transistor.

The arrangement described provides the following advantages:

1. It is particularly suited for the production of an alternating voltage at a low frequency, for example 10 Hz. or less, and may also produce an alternating voltage at a high frequency, however, this frequency is about one order of magnitude lower than that of the pulses generated by the pulse generator A, the alternating voltage being, say, 3,000 Hz. in the case of a pulse frequency of 25 kHz. The transformers 31, 62 and 67 must be adapted to the lowest frequency to be produced, and higher frequencies can then be obtained by changing the natural frequency of the tuned circuit E without further important alterations.
2. The frequency of the output voltage produced is substantially not influenced by the value of the load and/or its nature (capacitive, resistive or inductive).
3. Owing to the negative feedback used the internal impedance of the arrangement is very small so that the output voltage varies only little with load variations.
4. The production of an output voltage can readily be interrupted and/or restarted by breaking and making the contact of the switch 73, the decay and build up times being of the order of 10 and 15 periods of the output voltage respectively.
5. The arrangement is protected against short circuits: when the output terminals D are overloaded the modulation and hence the production of a low frequency voltage are immediately suppressed but they automatically build up again as soon as the overload or the short circuit has been removed.
6. The frequency of the switching pulses generated by the pulse generator A may be made so high that the arrangement produces no troublesome noise.
7. The output alternating voltage is influenced only slightly by supply voltage fluctuations.
8. The efficiency of switching amplifiers is essentially high so that with sufficient edge steepness of the switching pulses and in accordance with the output transformer used the output stage can operate at a high efficiency of say, 80 percent.

When suitable power transistors having a sufficient collector base current gain factor of both the NPN and PNP-types are available, each group of transistors, for example 40 and 40', may be replaced by a single transistor, and the coupling between the output stage and the stage including the transistors 24 and 25 may be effected in the same way as that between the latter stage and the last but one stage including the transistors 22 and 23 of the pulse generator A. This provides the advantage that the base current of each power transistor of the output stage flows through the load also, which results in an improved efficiency. In this case, the control transformer 31 and all the base resistors and capacitors of the output stage can be dispensed with, while the primary 61 of the output transformer 62 can be connected in the same way as the primary 30 of the transformer 31 of the embodiment described.

In a specific example of the arrangement described an output voltage of 50 Hz. was produced. When the resistive load increased from 27 to 74 watts the output voltage decreased from 36.2 volts to 34.8 volts and the frequency decreased from 50.5 Hz. 50.3 Hz. the efficiency of the output stage increasing from 78.5 to 79 percent. When an inductive load (consisting of a parallel combination of small synchronous motors) increased from 16 to 58 watts, the output voltage decreased from 36.8 to 35.2 volts and the frequency decreased from 50.5 to 49.5 Hz. the efficiency of the output stage increasing from 51.5 to 66.5 percent.

With a variation of the voltage of the supply source 3' from 43 to 54 volts (+26 percent) the output voltage varied only +6 percent from 36 volts RMS to 38.3 volts RMS. The switching losses in the transistors of the output stage then were 5 watts and the losses in the output transformer 62 also 5 watts. Especially the latter losses can be greatly reduced.

Figure 4:
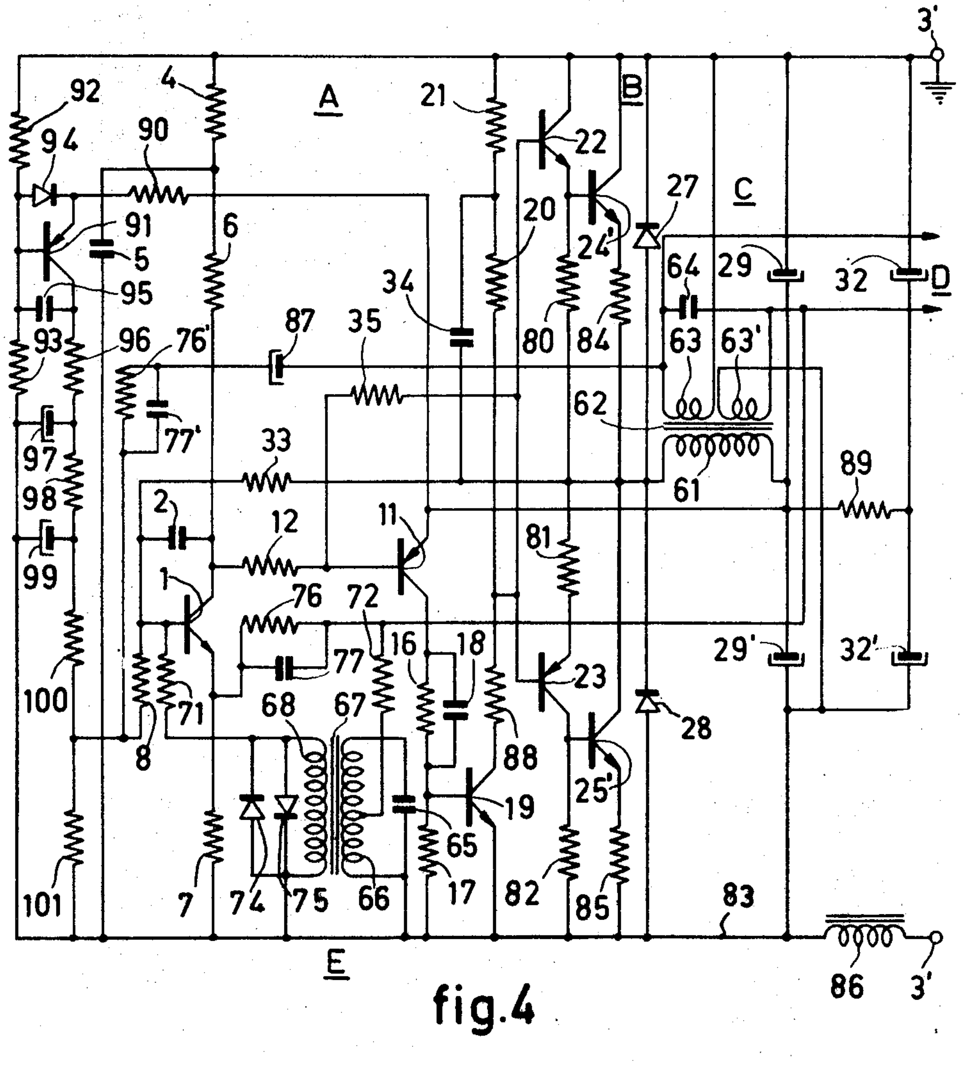
FIG. 4 is a circuit diagram of a second embodiment.

The second embodiment the circuit diagram of which is shown in FIG. 4 is a ringing-voltage generator for a telephone system The final stage of a pulse generator A including transistors 24' and 25' acts also as the output switching amplifier stage B of this arrangement. Since no corresponding transistor of the PNP-type was available, this stage was designed so as to include two transistors of the NPN-type 2N 3716, the transistor 24' being operated in common collector configuration and the transistor 25' in common emitter configuration. The transistors 22 and 23 of the preceding control stage were also operated in common collector and common emitter configuration respectively, the emitter of the transistor 22 being connected directly to the base of the transistor 24' and through a resistor 80 of, say 68 Ω to the junction point of the diodes 27 and 28, while the emitter of the transistor 23 is connected through a resistor 81 of 10 Ω to this junction point only and its collector is connected directly to the base of the transistor 25' and through a resistor 82 of 68 ohms to a negative supply line 83 of −48 volts. The emitter of the transistor 24' is connected to the said junction point through a resistor 84 of 0.5Ω and the emitter of the transistor 25' is connected to the supply line 83 through a resistor 85 of 0.5Ω.

The positive terminal of the single supply source 3' of 48 volts is connected to earth and its negative terminal is connected to the supply line 83 through a choke coil 86 of 0.4 H. This line is connected to earth through the series connection of two electrolytic capacitors 29 and 29' of 800 $\mu$f. each and through the series connection of two further electrolytic capacitors 32 and 32'. The capacitors 29 and 29' play the same part as the capacitor 29 of FIG. 1; together with the primary 61 of the transformer 62 they form the output circuit of the single-ended push-pull amplifier output stage including the transistors 24' and 25' and operating in the switching mode. The junction point of these capacitors is connected to that of the capacitors 32 and 32' through a resistor 89 of 10 Ω.

The secondary 63, 63' of the transformer 62 is split, one end of the center tapping being connected to earth and the other to the line 83, so that the voltage across the output terminals D normally is symmetrical with respect to the telephone line connected to these terminals. The negative feedback between these terminal D and the transistor 1 of the integrator stage consequently is also made symmetrical by coupling the upper output terminal D to the base of this transistor through an electrolytic separating capacitor 87 of 8 μf., a resistor 76′ of 83 k Ω shunted by a capacitor 77′ of 0.047 μf. and the resistor 8 of 10 kΩ.

Further small difference from the embodiment shown in FIG. 1 are that a resistor 88 of 22 ohms is connected between the collector of the transistor 19 and the bases of the transistor 22 and 23, and that the edge steepness of the switching pulses generated by the pulse generator A is further improved because if the fact that the feedback resistor 35 is only 330 kΩ. Furthermore, the values of some circuit elements were changed, inter alia for matching the arrangement to the common supply source 3′ of 48 volts. Thus, the resistance 16 has a value of 1.1 kΩ, the resistance 17 a value of 510Ω and the resistors 20 and 21 values of 4.7 kΩeach. The resistor 71 is 16 kΩ, the resistor 72 4.7 kΩ and the capacitor 65 has a value of 1.8 μf. for an output frequency of30 Hz., the potentiometer 69 and the diode 26 are omitted, and the negative feedback network 76, 77 comprises a resistor of 33 kΩ and a capacitor of 0.047 μf.

The transistor 1 here is of the type 2N 930, the transistors 11 and 23 are of the type 2N 2904 A and the transistors 19 and 22 of the type 170 BSY, while the limiting diodes 74 and 75 are of the type BAX 13.

However, the essential difference consists in that the arrangement of FIG. 4 further includes a direct-current negative feedback loop having a time constant which is large compared with the period of the alternating current to be generated so as to enable the pulse generator to be automatically balanced. This loop replaces the potentiometer 9 and the separating resistor 10 of FIG. 1. It further includes a transistor 91 of the type BCY 70 the emitter of which is connected through a resistor 90 of 100Ω to the junction point of the output capacitors 29 and 29′, while its base is connected to the tapping of a voltage divider comprising a resistor 92 of 16 kΩ and a resistor 93 of 13 kΩ which are connected in series between earth and the supply line 83. A diode 94 of the type BAX 13 is connected between the emitter and the base of the transistor 91 and prevents the base from becoming more positive with respect to the emitter than is necessary to cut off the transistor. A first integrating capacitor 95 of 2.2 μf. is connected between the base and the collector of the transistor 91, and the collector circuit of this transistor includes: a separating resistor 96 of 200 Ωa further integrating section comprising an electrolytic parallel capacitor 97 of 125 μf. and a series resistor 98 of 2.4 kΩ, a second further integrating section comprising an electrolytic parallel capacitor 99 of 125 μf. and a series resistor 100 of 2.4 kΩ, and a load resistor 101 of 82 Ωconnected in series with the resistor 100 across the parallel capacitor 99, the junction point of these resistors being connected to the base resistor 8 of the transistor 1.

The voltage across the capacitor 29 is compared with the voltage across the resistor 92 by means of the transistor 91. When the voltage across the capacitor increases, the collector current of the transistor 91 and hence the voltage across the resistor 101 decreases. As a result, the mean potential of the base of the transistor 1 becomes more negative, the base of the transistor 11 becomes less negative, that of the transistor 19 more negative and those of the transistors 22 and 23 less negative. Finally, the mean potential of the junction of the diodes 27 and 28 also becomes less negative so that the voltage across the capacitor 29 decreases again.

The resistor 92 is made larger than the resistor 93 in order to reduce the influence of the base-emitter voltage of the transistor 91 on the balancing. The direct-current negative feedback described stabilizes the potential of the junction point of the capacitors 29 and 29′ so that the voltage divider 13, 14, 15 of FIG. 1, by which a substantially constant reference potential is applied to the emitter of the transistor 11, can be replaced by a direct connection between this emitter and the junction point of the capacitors 29 and 29′. Actually, the voltage across the capacitor 29 always exceeds the voltage across the element 92 by the base-emitter voltage of the transistor 91.

The main function of the direct-current negative feedback is, however, to maintain the symmetry of the switching impulses generated in the absence of modulation and to maintain an "average symmetry" in the case of modulation, for such symmetry results in equality of the voltages across the capacitors 29 and 29′ so that the driving range of the amplifier is not restricted in one direction by asymmetry. In order to prevent the influence of the modulation on this balancing and the occurrence of instability the time constant of the load, viewed across the winding 61, together with the capacitors 29 and 29′ must be smaller than the sum of the time constant of the transistor 91 together with the capacitor 95 and of the RC sections 97, 98 and 99, 100.

It should be noted that one of the capacitors 29 and 29′ may be used as a direct-current source provided that the direct current which is derived form it and which also flows through the winding 61 does not inconveniently reduce the effective inductance across this winding by partially saturating the core of the transformer 62.

What is claimed is:

1. An electronic arrangement for generating an alternating current characterized in that it includes a pulse generator having a fixed frequency which is high compared with that of the alternating current to be generated and having a variable pulse width, a switching amplifier by which the pulses generated by this generator are amplified, a low-pass filter which is connected to the output terminals of this amplifier and through which the alternating current generated can be supplied to the output terminals of the arrangement, and a circuit which is tuned to the frequency of the alternating current to be generated and by way of which the generator can be pulse-width modulated by the output voltage of the low-pass filter.

2. An arrangement as claimed in claim 1, characterized in that the pulse generator is adjusted so that the mean width of the pulses it generates is equal to the mean interval between successive pulses.

3. An arrangement as claimed in claim 2, characterized in that it includes a direct-current negative feedback loop having a time constant which is large compared with the period of the alternating current generated and having the function of automatically balancing the pulse generator.

4. An arrangement as claimed in claim 1, characterized in that it includes a limiter for limiting the amplitude of the modulation voltage fed back to the pulse generator through the tuned circuit.

5. An arrangement as claimed in claim 1, characterized in that it comprises a linearizing negative feedback loop connected between one of the output terminals and one of the input terminals of the pulse generator.

6. An arrangement as claimed in claim 1, characterized in that the pulse generator is an RC generator, the pulse repetition of which is determined by a Miller integrator circuit including a transistor to the base of which the modulation voltage is fed back.

7. An arrangement as claimed in claim 1, characterized that the switching amplifier includes at least one Class D transistor push-pull amplifier stage.

8. An arrangement as claimed in claim 1, characterized in that the tuned circuit is coupled to the output terminals of the arrangement so that in the case of a short circuit or of overloading the modulation of the generator and the production of a sinusoidal alternating current are suppressed.